(12) United States Patent
Tanaka et al.

(10) Patent No.: US 11,703,416 B2
(45) Date of Patent: Jul. 18, 2023

(54) VALVE MAINTENANCE ASSISTANCE DEVICE AND ASSISTING METHOD

(71) Applicant: Azbil Corporation, Tokyo (JP)

(72) Inventors: Masato Tanaka, Tokyo (JP); Fumiaki Yamasaki, Tokyo (JP)

(73) Assignee: AZBIL CORPORATION, Tokyo (JP)

(*) Notice: Subject to any disclaimer, the term of this patent is extended or adjusted under 35 U.S.C. 154(b) by 387 days.

(21) Appl. No.: 16/940,979

(22) Filed: Jul. 28, 2020

(65) Prior Publication Data
US 2021/0033490 A1  Feb. 4, 2021

(30) Foreign Application Priority Data

Jul. 31, 2019 (JP) .............................. JP2019-140895

(51) Int. Cl.
| | |
|---|---|
| *G01M 13/003* | (2019.01) |
| *G05D 7/06* | (2006.01) |
| *G05B 23/02* | (2006.01) |
| *G06Q 10/20* | (2023.01) |
| *G01D 21/02* | (2006.01) |
| *G06Q 10/0639* | (2023.01) |

(52) U.S. Cl.
CPC .......... *G01M 13/003* (2019.01); *G01D 21/02* (2013.01); *G05B 23/0283* (2013.01); *G05D 7/0623* (2013.01); *G06Q 10/06393* (2013.01); *G06Q 10/20* (2013.01)

(58) Field of Classification Search
CPC ............... G01M 13/003; G05D 7/0623; Y10T 137/7761; G05B 23/0283; G06Q 10/20; G06Q 10/06393; G01D 21/02

USPC ....................................... 702/184; 137/487.5
See application file for complete search history.

(56) References Cited

U.S. PATENT DOCUMENTS

| | | | |
|---|---|---|---|
| 5,109,692 A * | 5/1992 | Fitzgerald | ........... F16K 37/0083 |
| | | | 702/183 |
| 5,750,879 A | 5/1998 | Ohtsuka et al. | |
| 6,862,547 B2 * | 3/2005 | Snowbarger | ....... G05B 19/0428 |
| | | | 73/1.72 |

(Continued)

FOREIGN PATENT DOCUMENTS

| | | |
|---|---|---|
| JP | 3254624 B2 | 2/2002 |
| JP | 2015-114942 A | 6/2015 |
| JP | 2015-114943 A | 6/2015 |

*Primary Examiner* — William M McCalister

(57) ABSTRACT

A valve maintenance assistance device includes: a valve ID storing portion configured to store IDs of an ON-OFF valve which may be a candidate for maintenance; an opening acquiring portion configured to acquire opening measurement data from an opening sensor provided on the ON-OFF valve; a pressure acquiring portion configured to acquire pressure measurement data on operating device air supplied to an operating device of the ON-OFF valve; a storing portion configured to store the opening measurement data and the pressure measurement data; and a diagnosis index calculating portion configured to calculate a dead zone time from when an operating device air pressure is changed until an opening degree of the ON-OFF valve is changed as a diagnosis index based on the pressure measurement data and the opening measurement data; and a diagnosis index presenting portion configured to present a numerical value of the diagnosis index calculated by the diagnosis index calculating portion.

10 Claims, 10 Drawing Sheets

(56) References Cited

U.S. PATENT DOCUMENTS

| | | | | |
|---|---|---|---|---|
| 7,478,012 | B2* | 1/2009 | Tewes | G05B 23/0232 |
| | | | | 702/183 |
| 7,996,096 | B2* | 8/2011 | Latwesen | F16K 37/0091 |
| | | | | 700/110 |
| 2005/0021298 | A1* | 1/2005 | Junk | G05B 23/0229 |
| | | | | 702/183 |
| 2006/0219299 | A1* | 10/2006 | Snowbarger | F16K 37/0091 |
| | | | | 137/487.5 |
| 2015/0276086 | A1* | 10/2015 | Wheeler | G01M 99/008 |
| | | | | 702/183 |
| 2017/0030972 | A1* | 2/2017 | Tanaka | F27D 21/04 |
| 2018/0149286 | A1* | 5/2018 | Ihalainen | G05D 7/06 |
| 2020/0073415 | A1* | 3/2020 | Lull | G05D 7/0623 |
| 2020/0131927 | A1* | 4/2020 | Tolmatsky | F16K 37/0091 |

* cited by examiner

VALVE MAINTENANCE ASSISTANCE DEVICE AND ASSISTING METHOD

CROSS-REFERENCE TO RELATED APPLICATION

The present application claims the benefit of and priority to Japanese Patent Application No. 2019-140895, filed on Jul. 31, 2019, the entire contents of which are incorporated by reference herein.

TECHNICAL FIELD

The present invention relates to technology for assisting a maintenance work and specifically to a valve maintenance assistance device and an assisting method for realizing an assistance for achieving an efficient work for maintenance of an ON-OFF valve.

BACKGROUND

Valves used in petrochemical plants (for example, a control valve illustrated in FIG. 13) need to be paid attention to specifically in terms of safeness, and thus are subject to regular maintenance. The control valve illustrated in FIG. 13 includes a valve body 100 configured to open and close a passage in which a fluid flows, a positioner 101 configured to convert an input electrical signal to air pressure, and an operating device 102 configured to operate the valve body 100 according to air pressure supplied from the positioner 101.

In order to improve maintenance work efficiency of the valve in plants where many valves as illustrated in FIG. 13 are installed, technology for detecting occurrence of stick-slip at a sliding portion of the valve (see PTL 1), technology for determining a hunting state of the valve (see PTL 2), technology for detecting adherence of scales to the valve (see PTL 3) and the like have been proposed.

In contrast, as valves of different types from a control valve which can change an opening degree continuously, there are ON-OFF valves which can only have opening degrees at two positions, namely, fully open/fully close positions, such as a ball valve, a butterfly valve, and a gate valve. An On-OFF valve 200 illustrated in FIG. 14 employs a ball valve, and has a structure in which a ball 201, which is a valve body, is sandwiched by a seat ring 202, which is a so-called ball seat, and is configured to open and close the valve by rotating a stem (valve rod) 203 by 90 degrees by an operating device 204. In some types, it is rotated by an angle other than 90 degrees.

The ON-OFF valve 200 is configured as illustrated in FIG. 15 in most cases, so that operating device air is supplied to the operating device 204 of the ON-Off valve 200 via an electromagnetic valve 205. An opened state of the ON-OFF valve 200 is detected by a limit switch 206, and a closed state is detected by a limit switch 207. In this manner, an answer back using the limit switches 206, 207 only indicates two states, the closed state or the opened state, and a process of opening and closing operation of the ON-OFF valve 200 is not reflected on the answer back. In other words, an answer back function of the ON-OFF valve 200 only issues an alarm when an abnormality occurs, and if it is already an emergent abnormal state when the alarm is issued, delayed treatment is resulted.

There is no upper limit such as "perfect" or "sufficient" in safeness and work efficiency, and further improvement is always required in the safeness and the work efficiency. Especially, in petrochemical plants, a plurality of valves 200-A, 200-C, and 200-M are used as illustrated in FIG. 16, for example. Therefore, further improvement is required for the work efficiency in maintenance of the valve.

CITATION LIST

Patent Literature

[PTL 1] Japanese Patent No. 3254624
[PTL 2] JP-A-2015-114942
[PTL 3] JP-A-2015-114943

SUMMARY

In order to solve the above-described problems, it is an object of the present invention to provide a valve maintenance assistance device and an assisting method which achieve improvement in work efficiency in maintenance of an ON-OFF valve.

A valve maintenance assistance device of the present invention comprises:

an opening acquiring portion configured to acquire opening measurement data from an opening sensor provided on an ON-OFF valve;

a pressure acquiring portion configured to acquire pressure measurement data on operating device air supplied to an operating device of the ON-OFF valve from a pressure sensor provided on the ON-OFF valve;

a first storing portion configured to store the opening measurement data and the pressure measurement data;

a diagnosis index calculating portion configured to calculate a dead zone time from when a pressure of the operating device air is started to change until an opening degree of the ON-OFF valve is started to change as a diagnosis index of the ON-OFF valve based on the pressure measurement data and the opening measurement data stored in the first storing portion; and a diagnosis index presenting portion configured to present a numerical value of the diagnosis index calculated by the diagnosis index calculating portion.

One configuration example of the valve maintenance assistance device of the present invention further comprises a determining portion configured to compare the diagnosis index with a threshold specified in advance; and a determination result presenting portion configured to present a determination result of the determining portion.

One configuration example of the valve maintenance assistance device of the present invention further comprises a second storing portion configured to store an ID of an ON-OFF valve which may be a candidate for maintenance in advance, in which the first storing portion stores the opening measurement data and the pressure measurement data together with an ID of a source ON-OFF valve, and the diagnosis index calculating portion calculates the diagnosis index of the ON-OFF valve having the ID stored in the second storing portion.

One configuration example of the valve maintenance assistance device of the present invention further comprises a second storing portion configured to store an ID of an ON-OFF valve which may be a candidate for maintenance in advance, wherein the first storing portion stores the opening measurement data and the pressure measurement data together with the ID of a source ON-OFF valve, the diagnosis index calculating portion calculates the diagnosis index of the ON-OFF valve having the ID stored in the second storing portion, and the determination result presenting portion is configured to present an ID and a numerical value equal to or greater than a threshold of an ON-OFF valve, the diagnosis index of which is determined to be equal to or greater than the threshold, in a form different from a normal case.

In one configuration example of the valve maintenance assistance device according to the present invention, the diagnosis index presenting portion presents information for notifying the fact that the diagnosis is directed to the ON-OFF valve together with the numerical value of the diagnosis index.

A valve maintenance assisting method of the present invention comprises:

a first step of acquiring opening measurement data from an opening sensor provided on an ON-OFF valve;

a second step of acquiring pressure measurement data on operating device air supplied to an operating device of the ON-OFF valve from a pressure sensor provided on the ON-OFF valve;

a third step of storing the opening measurement data and the pressure measurement data;

a fourth step of calculating a dead zone time from when a pressure of the operating device air is started to change until an opening degree of the ON-OFF valve is started to change as a diagnosis index of the ON-OFF valve based on the pressure measurement data and the opening measurement data; and a fifth step of presenting a numerical value of the diagnosis index.

According to the present invention, by calculating the dead zone time from when the pressure of the operating device air is changed until the opening degree of the ON-OFF valve is changed as the diagnosis index of the ON-OFF valve based on the pressure measurement data and the opening measurement data, and presenting the numerical value of the diagnosis index, a change in length of the dead zone time at a start of movement of the ON-OFF valve can be captured, and a work of an operator for selecting the ON-OFF valve as a candidate for maintenance can be assisted. Consequently, according to the present invention, an improvement in work efficiency in maintenance of the ON-OFF valve is achieved.

DETAILED DESCRIPTION

In a case of valves used in petrochemical plants, an occurrence of fluctuations in supplied operating device air pressure with respect to control commands (such as an electrical signal to an electromagnetic valve) depending on circumstances such as a state of usage of a compressor in an entire plant is rather natural. Therefore, fluctuations in time between the control command and a change in the operating device air pressure are not necessarily abnormal. In other words, it is not possible to determine the fault of the ON-OFF valve based on a dead zone at a start of movement following an activation of the ON-OFF valve with respect to the control command (a time difference between the electrical signal and the opening degree of the ON-OFF valve).

It is recognized that most of the ON-OFF valves have a simple structure such as to supply the operating device air pressure using an electromagnetic valve, and thus a foretaste of a fault of the ON-OFF valve appears in a simple form. The inventors then have found that mainly a sliding portion of the ON-OFF valve has high viscosity and substances having a large particle size (scales) adhered thereto, which causes lowering of an operating speed of the ON-OFF valve. The inventors have also found that when sealing parts (ground packings or gaskets) of the ON-OFF valve are abraded away and lose their original frictional force, the ON-OFF valve may be operated at a speed higher than the normal speed (for example, an occurrence of jumping when opening the valve because an inner valve is caught). The inventors have then found by their earnest research and study that a change in pressure to the operating device, in particular a change in length of the dead zone time at a start of movement correlates to the fault of the ON-OFF valve (operated by a force at torque higher than a standard torque or lower than the standard torque).

Figure 1:
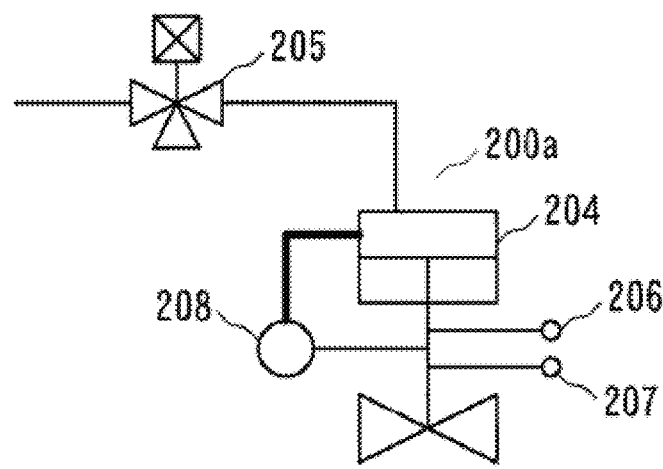
FIG. 1 is an instrumentation diagram of an ON-OFF valve of the present invention.

In the present invention, a pressure sensor 208 is provided on an ON-OFF valve 200a to allow a pressure value of operating device air supplied to an operating device 204 via an electromagnetic valve 205 to be detected, and an opening sensor is configured to sense a valve opening and closing operation (stroke) on the ON-OFF valve 200a as illustrated in FIG. 1. Accordingly, a change in pressure to the operating device 204 of the ON-OFF valve 200a and a change in opening degree of the ON-OFF valve 200a can be detected, and the dead zone time at a start of movement of the ON-OFF valve 200a with respect to the change in the operating device air pressure can be obtained. The fault of the ON-OFF valve 200a can then be estimated based on the dead zone time. Note that a limit switch 207 may be treated as a simple opening sensor to detect a time point when the valve is no longer in the closed state by the limit switch 207, and use the detected time point alternatively as a rising point of the valve opening of the ON-OFF valve 200a. However, the dead zone time can be obtained at a higher degree of accuracy in a case where an opening sensor that can sense the valve opening and closing operation (stroke) is provided.

First Embodiment

Figure 2:
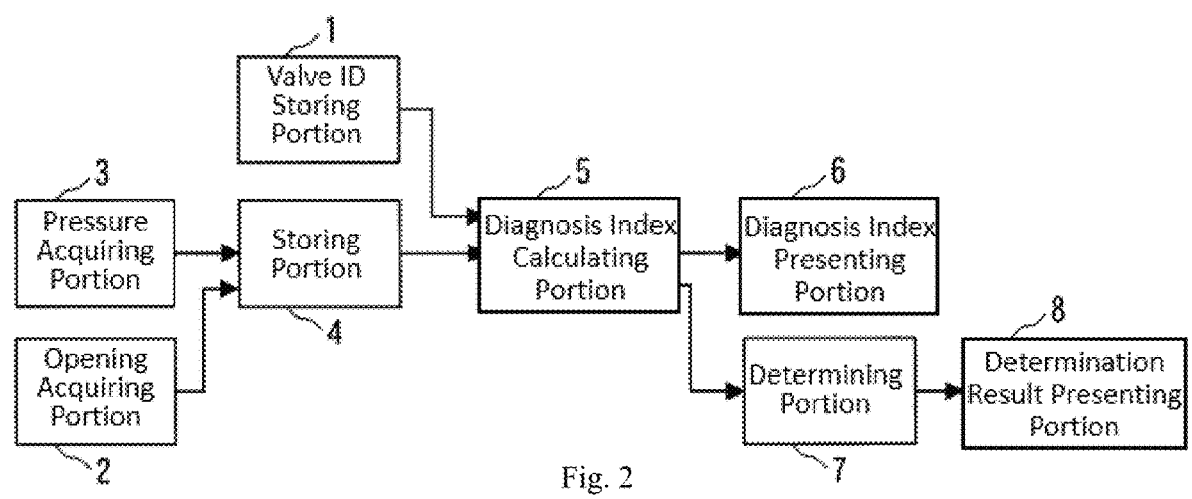
FIG. 2 is a block diagram illustrating a configuration of a valve maintenance assistance device according to a first embodiment of the present invention.

Referring now to the drawings, a first embodiment of the present invention will be described. FIG. 2 is a block diagram illustrating a configuration of a valve maintenance assistance device according to a first embodiment of the present invention. The present embodiment is an example in which the behavior of the ON-OFF valve is sensed by the length of the dead zone time at a start of movement of the ON-OFF valve with respect to the change in the operating device air pressure. For simplifying the description, a case of the valve ID is simplified in the following embodiment than that used in the actual plant.

A valve maintenance assistance device comprises: a valve ID storing portion 1 configured to store IDs (identification information) of a plurality of ON-OFF valves which may be a candidate for maintenance in advance; an opening acquiring portion 2 configured to acquire opening measurement data from an opening sensor provided on the ON-OFF valve; a pressure acquiring portion 3 configured to acquire pressure measurement data on operating device air supplied to an operating device of the ON-OFF valve from a pressure sensor provided on the ON-OFF valve; a storing portion 4 configured to store the opening measurement data and the pressure measurement data together with the ID of the source ON-OFF valve; a diagnosis index calculating portion 5 configured to calculate a dead zone time from when a pressure of the operating device air is changed until the opening degree of the ON-OFF valve is changed as a diagnosis index of the ON-OFF valve based on the pressure measurement data and the opening measurement data stored in the storing portion 4; a diagnosis index presenting portion 6 configured to present a numerical value of the diagnosis index calculated by the diagnosis index calculating portion 5; a determining portion 7 configured to compare the diagnosis index with a threshold specified in advance; and a determination result presenting portion 8 configured to present a determination result of the determining portion 7 and for the ON-OFF valve determined to have the diagnosis index equal to or greater than the threshold, present an ID of the valve and the numerical value equal to or greater than the threshold in a form different from a normal case.

Figure 3:
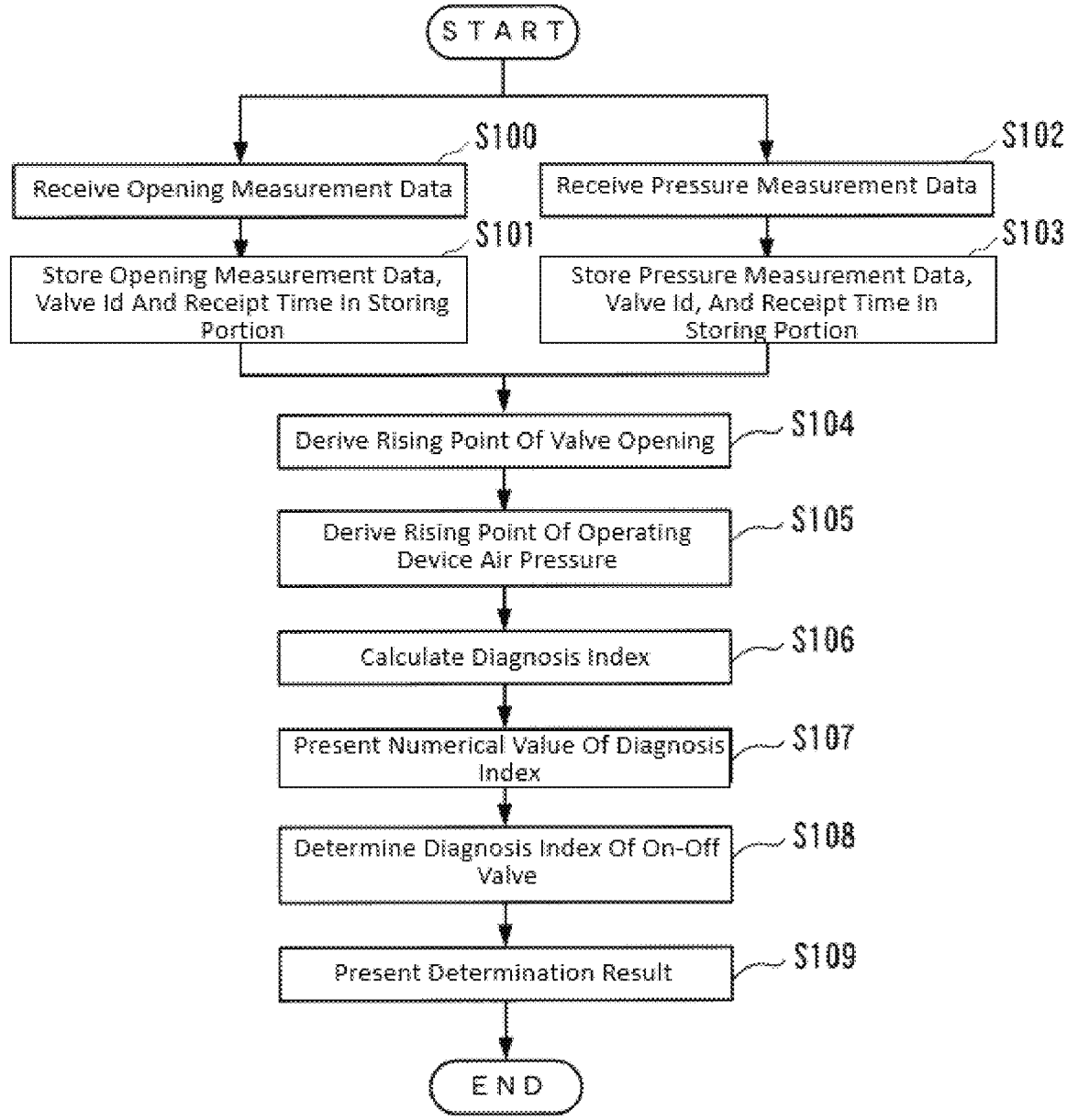
FIG. 3 is a flowchart explaining an operation of the valve maintenance assistance device according to the first embodiment of the present invention.

FIG. 3 is a flowchart for explaining an operation of the valve maintenance assistance device according to the present embodiment. In the present embodiment, for example, it is assumed that twenty-six valves are present in the plant, and specific IDs of "A", "B", "C", ..., "M", ..., X", "Y", "Z" are allocated respectively for the twenty-six valves in advance. It is assumed in particular that the valves having the valve IDs "A", "C", "M" are ON-OFF valves using an electromagnetic valve, and these IDs "A", "C", "M" are stored in the valve ID storing portion 1 in advance.

Figure 4:
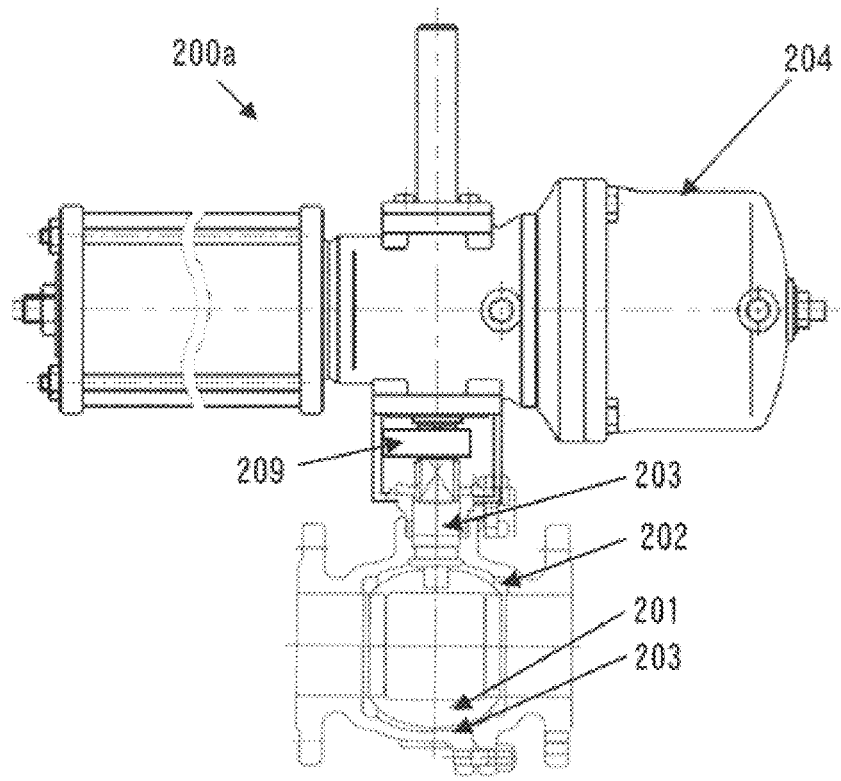
FIG. 4 is a drawing illustrating an example of a structure of the ON-OFF valve according to the first embodiment of the present invention.
Figure 14:
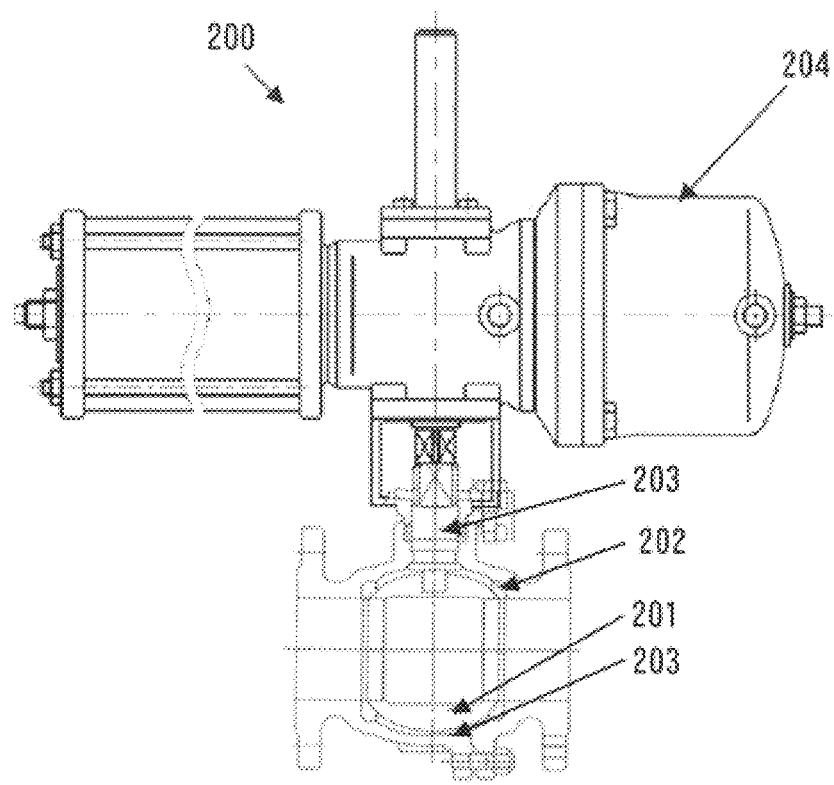
FIG. 14 is a drawing illustrating an example of the ON-OFF valve.
Figure 15:
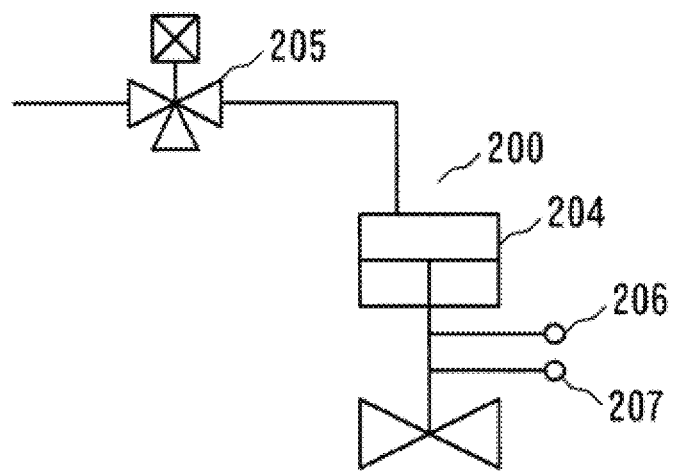
FIG. 15 is an instrumentation diagram of an ON-OFF valve of the related art.
Figure 16:
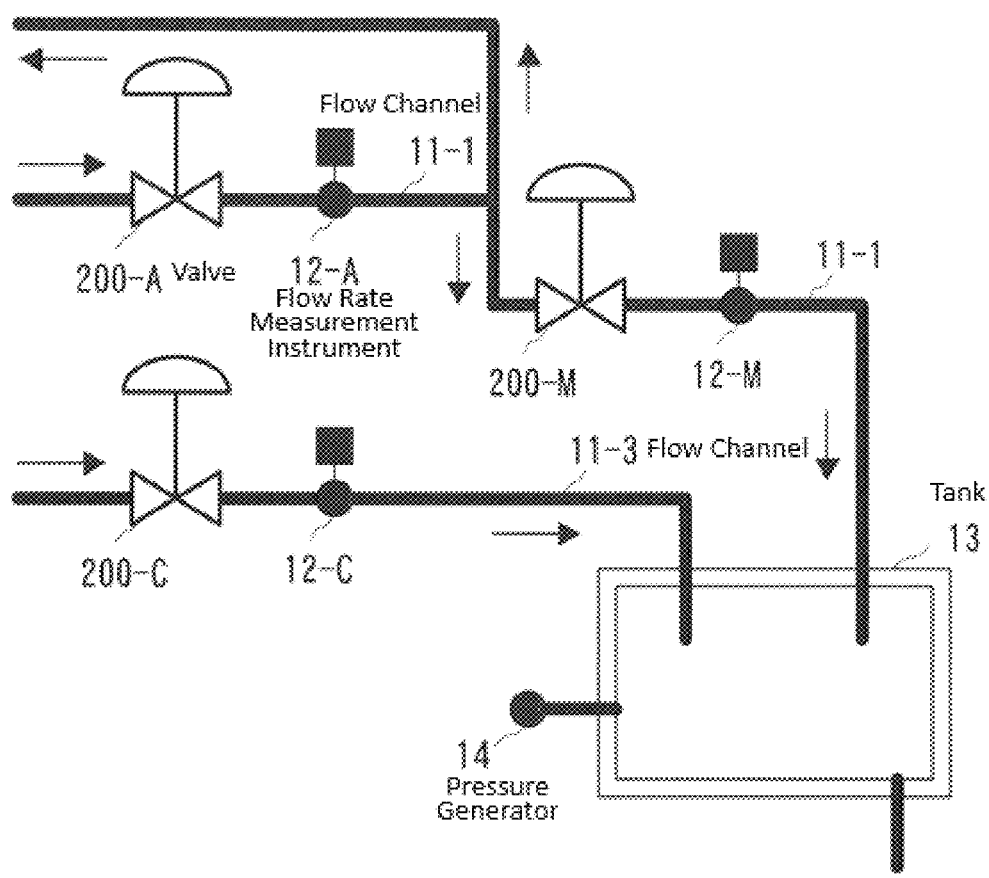
FIG. 16 is a drawing illustrating an example of a plurality of valves used in a tank of a plant.

An opening sensor is provided on each of the ON-OFF valves having the valve IDs "A", "C", and "M" together with the pressure sensor 208 described in conjunction with FIG. 1, so that the valve opening can be measured continuously. FIG. 4 is a drawing illustrating an exemplified structure of the ON-OFF valve 200a according to the present embodiment, which is equivalent to an ON-OFF valve 200 illustrated in FIG. 14 but is additionally provided with an opening sensor 209. Note that illustration of the pressure sensor 208 is omitted in FIG. 4. The position for adding the opening sensor 209 is not limited to the position illustrated in FIG. 4 and may be any position which allows measurement of the valve opening.

Figure 5:
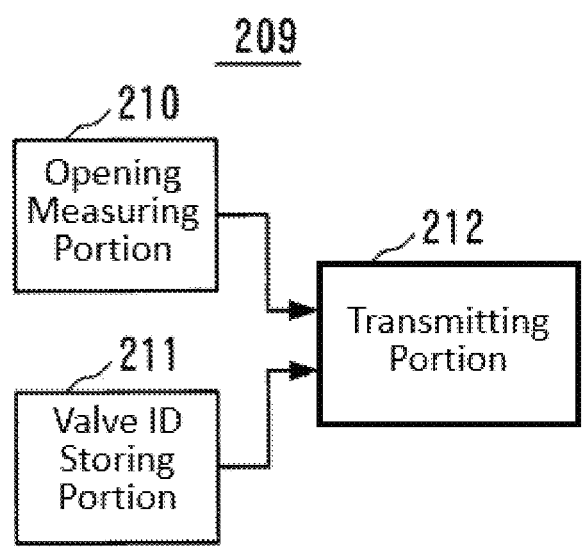
FIG. 5 is a block diagram illustrating a configuration of an opening sensor of the ON-OFF valve according to the first embodiment of the present invention.

FIG. 5 is a block diagram illustrating a configuration of the opening sensor 209. The opening sensor 209 comprises an opening measuring portion 210 configured to measure the valve opening continuously by detecting a rotation angle of a stem (valve rod) 203 of the ON-OFF valve 200a continuously; a valve ID storing portion 211 configured to store a valve ID specific for the ON-OFF valve 200a having the opening sensor 209 attached thereto; and a transmitting portion 212 configured to transmit the opening measurement data and the valve ID periodically to the valve maintenance assistance device.

The transmitting portion 212 transmits the opening measurement data with the valve ID stored in the valve ID storing portion 211 attached thereto. Note that the opening degree of the ON-OFF valve 200a needs to be acquired continuously, and thus a measurement/transmission cycle of the opening measurement data needs to be shorter than a minimum possible value of time required for opening and closing the ON-OFF valve 200a.

Figure 6:
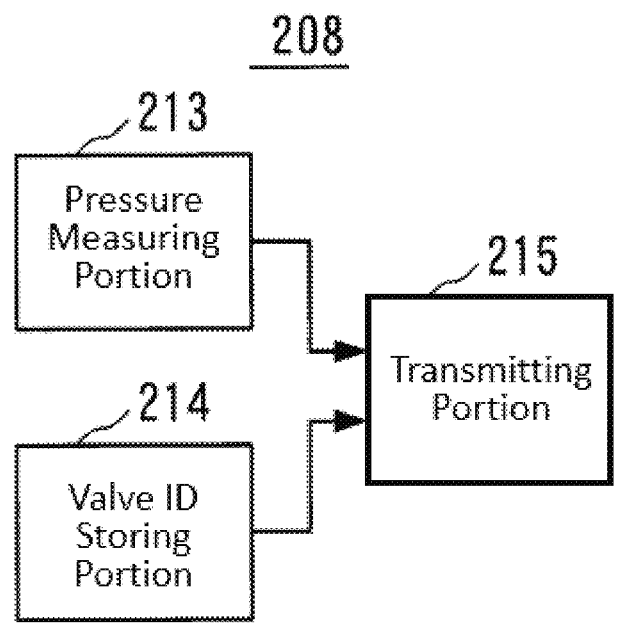
FIG. 6 is a block diagram illustrating a configuration of a pressure sensor of the ON-OFF valve according to the first embodiment of the present invention.

FIG. 6 is a block diagram illustrating a configuration of the pressure sensor 208. The pressure sensor 208 comprises: a pressure measuring portion 213 configured to detect a pressure value of the operating device air supplied to the operating device 204 of the ON-OFF valve 200a via the electromagnetic valve 205 continuously; a valve ID storing portion 214 configured to store a valve ID specific for the ON-OFF valve 200a having the pressure sensor 208 attached thereto; and a transmitting portion 215 configured to transmit the pressure measurement data and the valve ID periodically to the valve maintenance assistance device. In the same manner as the case of the opening measurement data, a measurement/transmission cycle of the pressure measurement data needs to be shorter than the minimum possible value of time required for opening and closing the ON-OFF valve 200a.

The opening acquiring portion 2 of the valve maintenance assistance device receives the opening measurement data from the opening sensor 209 of each of the ON-OFF valves 200a (Step S100 in FIG. 3), and stores the received opening measurement data and the valve ID added to the opening measurement data and a receipt time of the opening measurement data in the storing portion 4 (Step S101 in FIG. 3).

Separately, the pressure acquiring portion 3 of the valve maintenance assistance device receives the pressure measurement data from the pressure sensor 208 of each of the ON-OFF valves 200a (Step S102 in FIG. 3), and stores the received pressure measurement data and the valve ID added to the pressure measurement data and a receipt time of the pressure measurement data in the storing portion 4 (Step S103 in FIG. 3).

As described above, the valve opening and the operating device air pressure are measured periodically. Therefore, the opening acquiring portion 2 performs the processes in Steps S100 and S101 periodically and the pressure acquiring portion 3 performs the processes in Steps S102 and S103 periodically.

Note that in the present embodiment, the opening measurement data and the pressure measurement data are transmitted individually. However, it is needless to say that the transmitting portions of the pressure sensor 208 and the opening sensor 209 may be integrated to transmit the opening measurement data and the pressure measurement data together.

Subsequently, the diagnosis index calculating portion 5 of the valve maintenance assistance device obtains a rising point of the valve opening based on the opening measurement data stored in the storing portion 4 for each of the ON-OFF valves 200a which has the valve ID registered in the valve ID storing portion 1 and may be a candidate for maintenance (Step S104 in FIG. 3). The diagnosis index calculating portion 5 also obtains a rising point of the operating device air pressure based on the pressure measurement data stored in the storing portion 4 for each of the ON-OFF valves 200a which may be a candidate for maintenance (Step S105 in FIG. 3).

Figure 7:
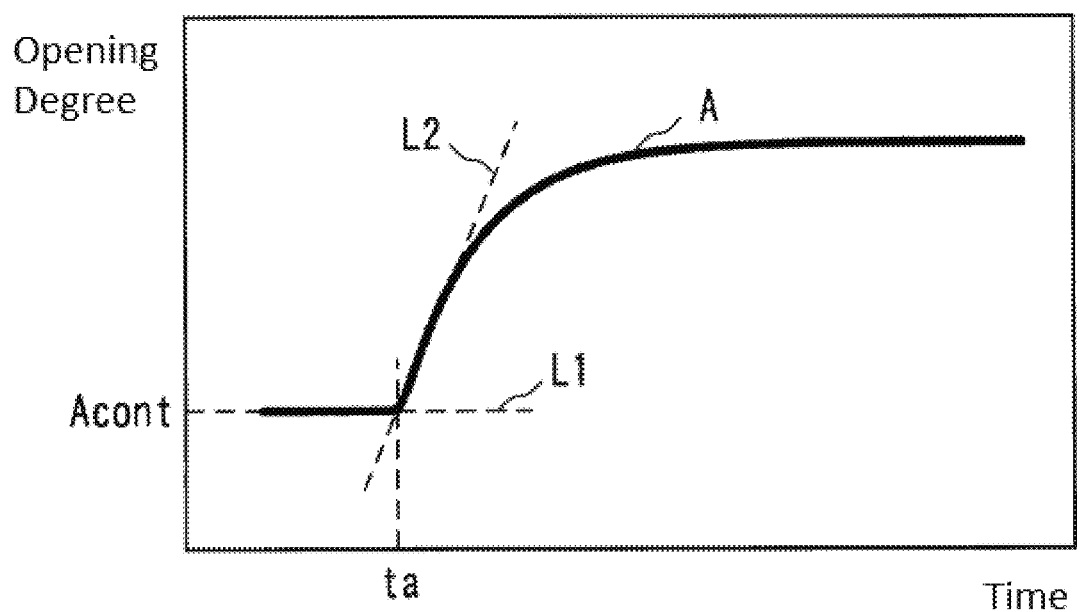
FIG. 7 is a drawing explaining a method of deriving a rising point of a valve opening.

As described above, as the storing portion 4 stores the opening measurement data, the valve ID, and receipt time of the opening measurement data obtained in time series, it is possible to obtain the rising point of the valve opening. FIG. 7 is a drawing explaining a method of deriving a rising point of the valve opening. It is assumed that a change curve of valve opening such as, for example, as illustrated in FIG. 7, is obtained from the opening measurement data and the receipt time. The diagnosis index calculating portion 5 may obtain a point on a change curve of valve opening where the inclination of the change becomes maximum when the valve opening A is changed by an amount equal to or greater than a specified opening width with respect to a setting value Acont, and define a time point when a tangent line L2 at this point intersects an extension L1 of the setting value Acont as a rising point ta of the valve opening A.

In the same manner, the storing portion 4 stores the pressure measurement data, the valve IDs, and the receipt time of the pressure measurement data obtained in time series. The diagnosis index calculating portion 5 may obtain a point on the change curve of operating device air pressure where the inclination of the change becomes maximum when an operating device air pressure P is changed by an amount equal to or greater than a specified pressure width with respect to a setting value thereof, and define a time point when a tangent line at this point intersects an extension of the setting value as a rising point tp of the operating device air pressure P.

The diagnosis index calculating portion 5 calculates a time difference (dead zone time) ta–tp between the rising point ta of the valve opening A and the rising point tp of the operating device air pressure P as a diagnosis index Tx (Step S106 in FIG. 3).

The diagnosis index presenting portion 6 of the valve maintenance assistance device presents a numerical value of the diagnosis index Tx of each of the ON-OFF valves 200a calculated by the diagnosis index calculating portion 5 to the operator (Step S107 in FIG. 3). At this time, the diagnosis index presenting portion 6 presents information that notifies the fact that diagnosis is directed to an ON-OFF valve which may be a candidate for maintenance together with the numerical value of the diagnosis index Tx.

In the present embodiment, since the presentation as described above shows operators who have poor knowledge about the necessity of maintenance of the ON-OFF valves the necessity of focusing on the ON-OFF valve quantitatively, probability of occurrence of failure to check the ON-OFF valves may be reduced.

Next, the determining portion 7 of the valve maintenance assistance device determines whether or not the diagnosis index Tx of each of the ON-OFF valves 200a having the valve IDs registered in the valve ID storing portion 1 is equal to or greater than a threshold TH specified in advance for each of the ON-OFF valves (Step S108 in FIG. 3).

The determination result presenting portion 8 of the valve maintenance assistance device presents the determination result of the determining portion 7 to the operator (Step S109 in FIG. 3). Specifically, the determination result presenting portion 8 may, for the ON-OFF valve determined to have the diagnosis index Tx equal to or greater than the threshold, display an ID of the valve and the numerical value equal to or greater than the threshold in a form different from a normal case (for example, display in red).

In this manner, the processes from Steps S100 to S109 in FIG. 3 are performed regularly or when the operator issues an instruction for performing a diagnosis.

Figure 8:
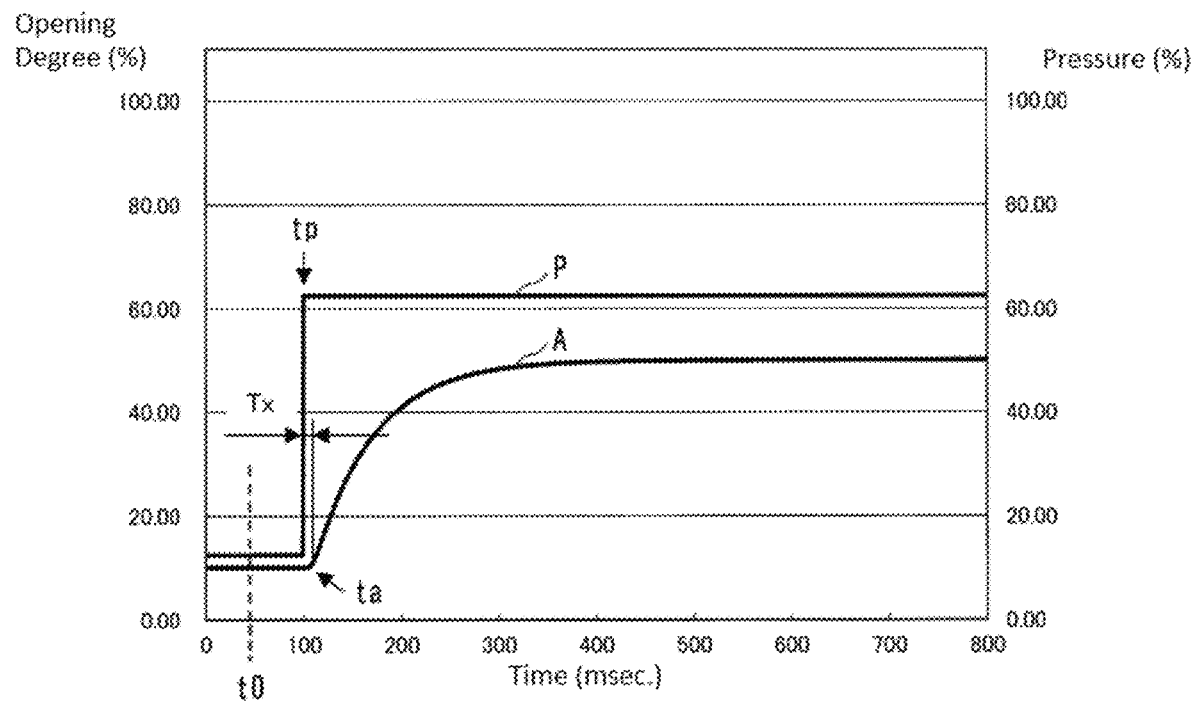
FIG. 8 is a drawing illustrating a result of simulation of a normal operation of the ON-OFF valve.
Figure 9:
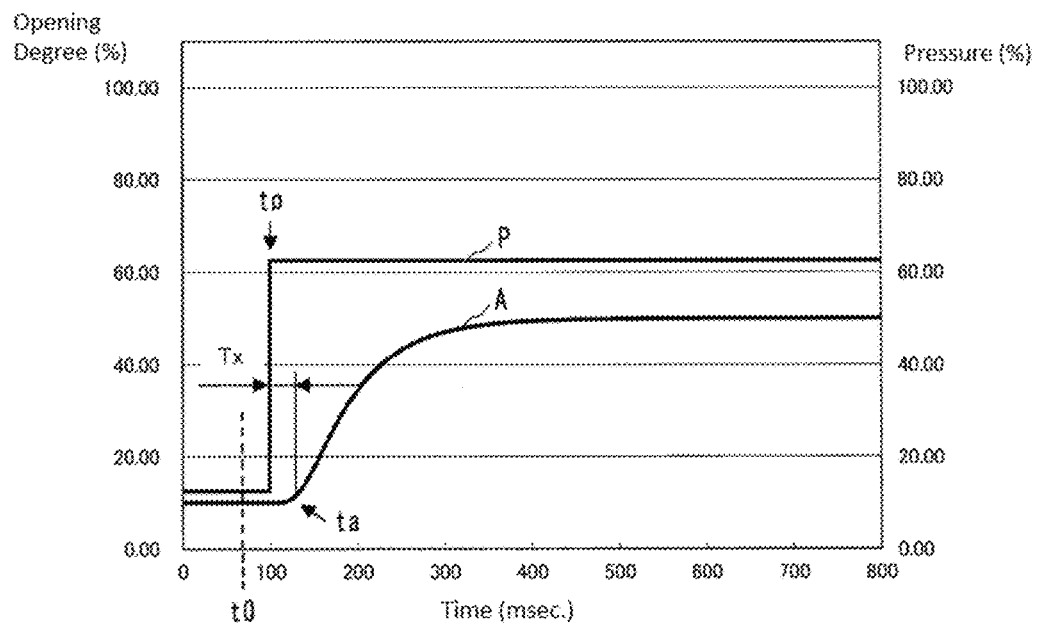
FIG. 9 is a drawing illustrating a result of simulation of an abnormal operation of the ON-OFF valve.

FIG. 8 is a drawing illustrating a result of simulation of a normal operation of the ON-OFF valve, and FIG. 9 is a drawing illustrating a result of simulation of an abnormal operation of the ON-OFF valve. Here, the operating device air pressure P is expressed in percentage with respect to the maximum possible value. In the normal example illustrated in FIG. 8, the diagnosis index Tx is 10 msec. (0.01 sec.), while in the example illustrated in FIG. 9, the diagnosis index Tx is 30 msec. (0.03 sec.) and an operating speed of the ON-OFF valve is lowered.

Note that t0 in FIG. 8 and FIG. 9 indicates an input point of a control command (for example, an electrical signal to the electromagnetic valve 205). In the examples in FIG. 8 and FIG. 9, the time difference between the input point t0 of the control command and the rising point tp of the operating device air pressure P fluctuates. Accordingly, in FIG. 8 and FIG. 9, the dead zone time at a start of movement (ta–t0) of the ON-OFF valve for the control command is the same.

Figure 10:
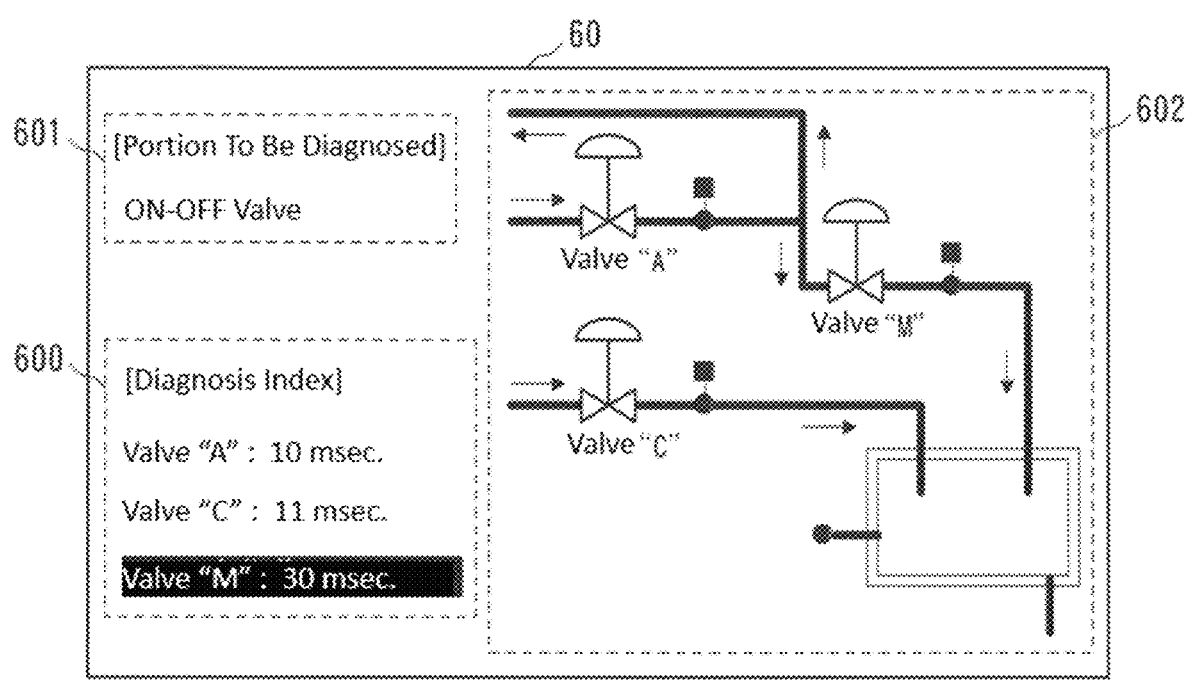
FIG. 10 is a drawing illustrating an example of presentation of a diagnosis index by a diagnosis index presenting portion and a determination result presenting portion of the valve maintenance assistance device according to the first embodiment of the present invention.

FIG. 10 is a drawing illustrating an example of presentation of the diagnosis index by the diagnosis index presenting portion 6 and the determination result presenting portion 8. In the example illustrated in FIG. 10, diagnosis indexes Tx of the respective valves having the valve IDs "A", "C", and "M" are displayed in a region 600 in a screen 60 displayed by the diagnosis index presenting portion 6. The diagnosis index presenting portion 6 displays information notifying the fact that the diagnosis is directed to the "ON-OFF valve" in a region 601 in the screen 60. The diagnosis index presenting portion 6 may also display a pipe instrumentation diagram 602 of a part where the ON-OFF valves to be diagnosed are disposed on the screen 60 as illustrated in FIG. 10 by using image data prepared in advance.

In the present embodiment, the threshold TH is set, for example, to 20 msec. In the example illustrated in FIG. 10, the diagnosis index of the ON-OFF valve having the valve ID "M" is 30 msec. Therefore, the determination result presenting portion 8 displays the numerical value of the diagnosis index and the valve ID in a color different from the color of the diagnosis indexes of other ON-OFF valves (white characters on a black base in the example illustrated in FIG. 10).

In this manner, in the present embodiment, a change in length of the dead zone time at a start of movement (time difference between the rising point of the operating device air pressure and the rising point of the valve opening) of the ON-OFF valve can be captured, so that a work of the operator for selecting the ON-OFF valve as a candidate for maintenance can be assisted.

Second Embodiment

Figure 11:
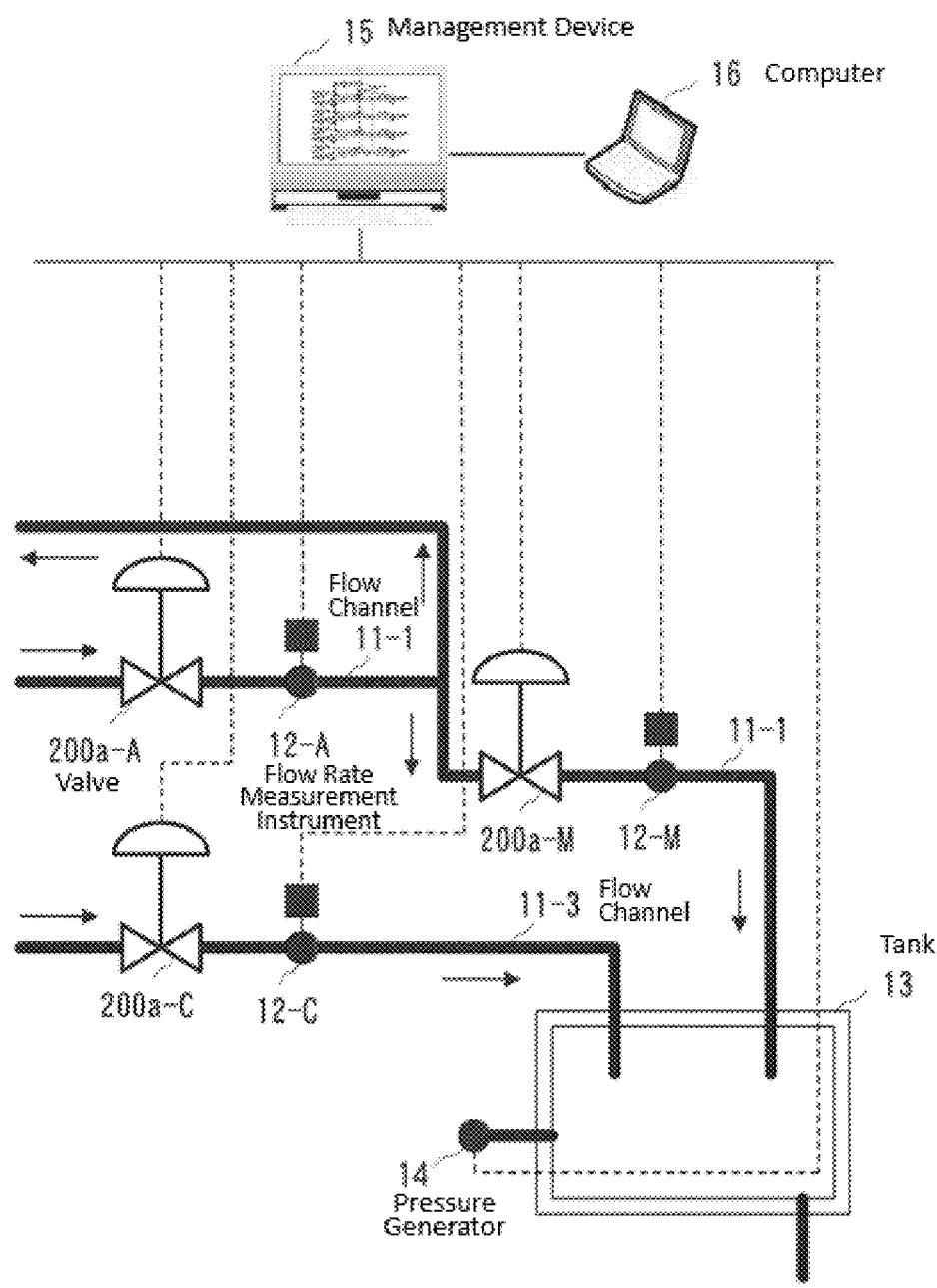
FIG. 11 is a drawing illustrating a configuration of a plant and a device managing system according to a second embodiment of the present invention.

Next, a second embodiment of the present invention will be described. The present embodiment describes an example of implementation of the first embodiment. FIG. 11 is a drawing illustrating a configuration of a plant and a device managing system thereof. In the present embodiment, it is assumed that ON-OFF valves 200a-A and 200a-M having valve IDs "A" and "M" are disposed in a flow channel 11-1, and an ON-OFF valve 200a-C having a valve ID "C" is disposed in a flow channel 11-3. Reference signs 12-A, 12-C, and 12-M in FIG. 11 designate flow rate measurement instruments, 13 designates a tank and 14 designates a pressure generator. Note that description of valves other than those having the valve IDs "A", "C", and "M" is omitted in FIG. 11.

The device managing system of a petrochemical plant is provided with a management device 15 configured to control and manage various devices in the plant. The valve ID storing portion 1, the opening acquiring portion 2, the pressure acquiring portion 3, the storing portion 4, and the diagnosis index calculating portion 5 described in the first embodiment are preferably mounted on the management device 15 because a large amount of information specific for the plant is treated.

Correspondingly, the diagnosis index presenting portion 6, the determining portion 7, and the determination result presenting portion 8 are in principle configured to provide processes required only for determining whether maintenance of a valve is necessary. In addition, a person who performs maintenance (a person in charge of a work in a maintenance entrusted company) generally performs maintenance of the plant when consigned by a plant owner company. Therefore, on the assumption that many and unspecified plants are targeted, it is preferable to implement the diagnosis index presenting portion 6, the determining portion 7, and the determination result presenting portion 8 on a mobile computer 16 which is carried by a person in charge of operation (operator) of the maintenance entrusted company.

The management device 15 and the computer 16 of the plant are temporarily connected by using a communication function such as Ethernet (registered trademark) or the like when performing the maintenance work.

When the operator activates application software on the computer 16, a CPU of the computer 16 executes processing according to a program stored in a memory and achieves functions as the diagnosis index presenting portion 6, the determining portion 7, and the determination result presenting portion 8.

The diagnosis index presenting portion 6 reads the valve ID from the valve ID storing portion 1 on the management device 15, reads the diagnosis index of each of the ON-OFF valves 200a calculated by the diagnosis index calculating portion 5, and displays on a display of the computer 16 (Step S107 in FIG. 3). The determination result presenting portion 8 displays the determination result of the determining portion 7 on the display of the computer 16 (Step S109 in FIG. 3).

The operator confirms an ON-OFF valve 200a to note specifically based on the displayed valve ID, the diagnosis index, and the determination result. The operator confirms displayed items and then disconnects the computer 16 from the management device 15.

In this manner, the valve maintenance assistance device described in the first embodiment may be applied to the actual plant.

Figure 12:
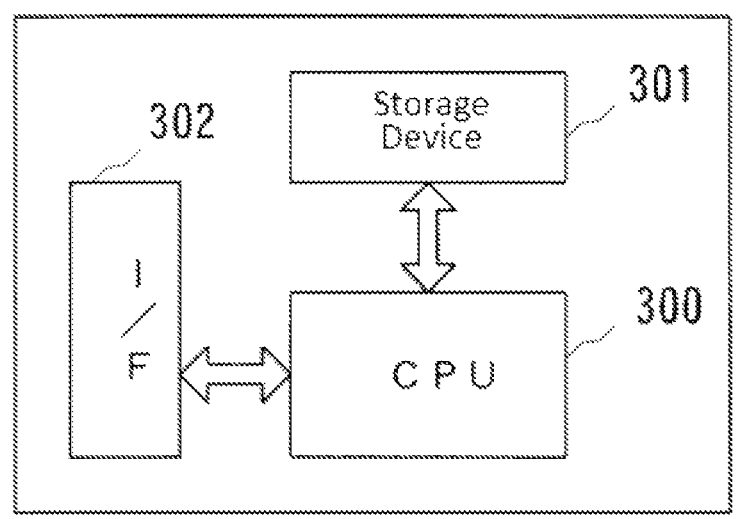
FIG. 12 is a block diagram illustrating a configuration example of a computer which realizes the valve maintenance assistance device according to the first and second embodiments of the present invention.
Figure 13:
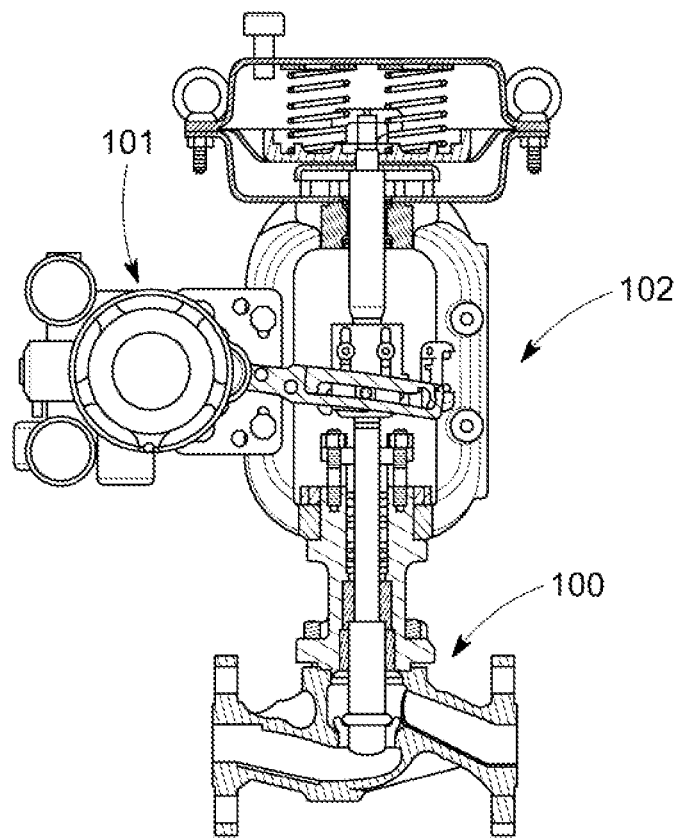
FIG. 13 is a drawing illustrating an example of a control valve.

The valve maintenance assistance device described in the first and second embodiments can be implemented by a computer including a Central Processing Unit (CPU), a storage device, and an interface, and a program configured to control these hardware resources. A configuration example of the computer is illustrated in FIG. 12. The computer comprises a CPU 300, a storage device 301, and an interface device (hereinafter abbreviated as I/F) 302. For example, the valve, the management device, the display, and the like are connected to the OF 302. In such a computer, a program for causing the computer to realize the valve maintenance assisting method according to the present invention is stored in the storage device 301. The CPU 300 executes the processing described in the first and second embodiments in accordance with the program stored in the storage device 301.

Note that in a case where implementing the valve maintenance assistance device separately as the management device 15 and the computer 16 as illustrated in the second embodiment, these devices may be realized respectively in a configuration illustrated in FIG. 12.

INDUSTRIAL APPLICABILITY

The present invention may be applied to technology for assisting a valve maintenance work.

DESCRIPTION OF REFERENCE NUMERALS AND SIGNS 1, 211, 214 valve ID storing portion
2 opening acquiring portion
3 pressure acquiring portion
4 storing portion
5 diagnosis index calculating portion
6 diagnosis index presenting portion
7 determining portion
8 determination result presenting portion
11-1, 11-3 flow channel
12-A, 12-C, 12-M flow rate measurement instrument
13 tank
14 pressure generator
15 management device
16 computer
200a ON-OFF valve
208 pressure sensor
209 opening sensor
210 opening measuring portion
212, 215 transmitting portion
213 pressure measuring portion

What is claimed is:

1. A valve maintenance assistance device, comprising:
an opening acquiring portion configured to acquire opening measurement data from an opening sensor provided on an ON-OFF valve;
a pressure acquiring portion configured to acquire pressure measurement data on operating device air supplied to an operating device of the ON-OFF valve from a pressure sensor provided on the ON-OFF valve;
a first storing portion configured to store the opening measurement data and the pressure measurement data;

a diagnosis index calculating portion configured to calculate a dead zone time from when a pressure of the operating device air starts to change until an opening degree of the ON-OFF valve starts to change as a diagnosis index of the ON-OFF valve based on the pressure measurement data and the opening measurement data stored in the first storing portion; and a diagnosis index presenting portion configured to present a numerical value of the diagnosis index calculated by the diagnosis index calculating portion.

2. The valve maintenance assistance device according to claim 1, further comprising:
   a determining portion configured to compare the diagnosis index with a threshold specified in advance; and
   a determination result presenting portion configured to present a determination result of the determining portion.

3. The valve maintenance assistance device according to claim 2, further comprising
   a second storing portion configured to store an ID of an ON-OFF valve which may be a candidate for maintenance in advance,
   wherein
   the first storing portion stores the opening measurement data and the pressure measurement data together with an ID of a source ON-OFF valve,
   the diagnosis index calculating portion calculates the diagnosis index of the ON-OFF valve having the ID stored in the second storing portion, and
   the determination result presenting portion is configured to present the ID and the numerical value equal to or greater than the threshold of the ON-OFF valve, the diagnosis index of which is determined to be equal to or greater than the threshold, in a form different from a normal case.

4. The valve maintenance assistance device according to claim 1, further comprising
   a second storing portion configured to store an ID of an ON-OFF valve which may be a candidate for maintenance in advance,
   wherein
   the first storing portion stores the opening measurement data and the pressure measurement data together with an ID of a source ON-OFF valve, and
   the diagnosis index calculating portion calculates the diagnosis index of the ON-OFF valve having the ID stored in the second storing portion.

5. The valve maintenance assistance device according to claim 1, wherein the diagnosis index presenting portion presents information for notifying a fact that a diagnosis is directed to the ON-OFF valve together with a numerical value of the diagnosis index.

6. A valve maintenance assisting method, comprising:
   acquiring opening measurement data from an opening sensor provided on an ON-OFF valve;
   acquiring pressure measurement data on operating device air supplied to an operating device of the ON-OFF valve from a pressure sensor provided on the ON-OFF valve;
   storing the opening measurement data and the pressure measurement data;
   calculating a dead zone time from when a pressure of the operating device air is started to change until an opening degree of the ON-OFF valve is started to change as a diagnosis index of the ON-OFF valve based on the pressure measurement data and the opening measurement data; and
   presenting a numerical value of the diagnosis index.

7. The valve maintenance assisting method according to claim 6, further comprising:
   comparing the diagnosis index with a threshold specified in advance; and
   presenting a determination result of the comparing step.

8. The valve maintenance assisting method according to claim 7, wherein
   the storing comprises storing the opening measurement data and the pressure measurement data together with an ID of a source ON-OFF valve,
   the calculating comprises referring to the stored ID of a candidate for maintenance stored in advance and calculating the diagnosis index of the ON-OFF valve having the stored ID, and
   the determination result presenting comprises presenting the ID and the numerical value equal to or greater than the threshold of the ON-OFF valve, the diagnosis index of which is determined to be equal to or greater than the threshold, in a form different from a normal case.

9. The valve maintenance assisting method according to claim 6, wherein
   the storing comprises storing the opening measurement data and the pressure measurement data together with an ID of a source ON-OFF valve, and
   the calculating comprises referring to the stored ID of a candidate for maintenance stored in advance and calculating the diagnosis index of the ON-OFF valve having the stored ID.

10. The valve maintenance assisting method according to claim 6, wherein the numerical value presenting comprises presenting information for notifying a fact that the diagnosis is directed to the ON-OFF valve together with the numerical value of the diagnosis index.

* * * * *